United States Patent [19]

Malloy et al.

[11] 4,318,819

[45] Mar. 9, 1982

[54] CHIRAL SUPPORTS FOR RESOLUTION OF RACEMATES

[75] Inventors: Thomas P. Malloy, Lake Zurich; Michael D. Tufano, Broadview, both of Ill.

[73] Assignee: UOP Inc., Des Plaines, Ill.

[21] Appl. No.: 124,396

[22] Filed: Feb. 25, 1980

[51] Int. Cl.³ .............................................. B01D 15/08
[52] U.S. Cl. .................................... 252/184; 210/635; 210/659; 252/430; 428/407; 428/451; 428/702
[58] Field of Search ................... 252/184, 430, 455 R, 252/463; 210/635, 656, 659; 428/404, 407, 451, 702

[56] References Cited

U.S. PATENT DOCUMENTS 4,111,838  9/1978  Schaeffer ............................ 210/656
4,159,966  7/1979  Roberts .............................. 252/430

OTHER PUBLICATIONS

Baczok et al., J. of Chromatography, vol. 60, (1971), pp. 351–361.

*Primary Examiner*—Benjamin R. Padgett
*Assistant Examiner*—Irwin Gluck
*Attorney, Agent, or Firm*—James R. Hoatson, Jr.; Raymond H. Nelson; William H. Page, II

[57] ABSTRACT

Material which can be utilized as the stationary phase in liquid-solid chromatography for the resolution of racemic mixtures comprises an inorganic oxide silylated with a reagent whose remaining terminus is covalently bonded to a chiral hydroxy acid. For example, a 3-aminopropylsilylated silica gel may be reacted with a chiral tartaric anhydride to form a carboxamide linkage by which the chiral acid is covalently bound to the support.

9 Claims, No Drawings

CHIRAL SUPPORTS FOR RESOLUTION OF RACEMATES

BACKGROUND OF THE INVENTION

Ever since Pasteur discovered the property of optical activity displayed by chiral compounds, the resolution of racemic mixtures into their enantiomeric components has posed a challenge. Substantial progress in separating enantiomeric pairs has been achieved since Pasteur's laborious hand separation of the enantiomeric crystals of racemic sodium ammonium tartrate, yet methods of resolution, and the materials used therefor, remain a formidable obstacle to commercial production of optically active organic substances.

A traditional method of resolution comprises reacting a racemic mixture with a second optically active substance to form a pair of diastereomeric derivatives. Such derivatives generally have different physical properties which permit their separation by conventional means. For example, fractional crystallization often permits substantial separation to afford at least one of the diastereomers in a pure state, or largely so. An appropriate chemical transformation then converts the purified derivative, which was formed initially solely to prepare a diastereomeric pair, into one enantiomer of the originally racemic compound. This traditional method is exemplified by the reaction of naturally occurring optically active alkaloids, for example, brucine, with racemic acids to form diastereomic salts, with release of an optically active organic acid from a purified diastereomer upon acidification of the latter.

Such traditional methods suffer from many limitations. Generally, only one of the enantiomeric pairs can be obtained, so yields are necessarily less than 50%. The separation of the material so obtained usually is incomplete, leading to materials with enhanced rather than complete optical purity. The optically active materials used to form the diastereomers frequently are expensive and quite toxic—the alkaloids as a class are good examples—and are only partially recoverable. Regeneration of optically active material from its derivative may itself cause racemization of the desired compound, leading to diminution of optical purity. For example, if optically active benzyl alcohols are prepared through their diastereomeric ester derivatives, subsequent acid hydrolysis of the latter to regenerate the alcohol may be accompanied by appreciable racemization.

With the advent of chromatography diverse variations on the basic method of separating diastereomers became possible. These approaches undeniably represent substantial advances in the art, yet fail to surmount the basic need, and associated problems, to prepare diastereomeric derivatives of the desired compound and to transform such derivatives after separation to the optically active compounds of interest.

Chromatographic methods of separation offer advantages of general application, mild conditions which generally preclude chemical or physical transformation, efficiency of recovery and separation which are limited only by the number of theoretical plates employed, and the capability of utilization from a milligram to kilogram scale. Translation from a laboratory to industrial scale has proved feasible, and commercial processes employing chromatographic separation occupy an important position in the arsenal of available industrial methods. For such reasons, methods based on chromatographic separation remain under intensive exploration.

To circumvent the disadvantage of separating diastereomeric derivatives of a compound while retaining the advantages of chromatographic separation, recent advances in the art have employed chiral, optically active compounds in association with the chromatographic support. The theory underlying this approach is that chiral material will have differential weak interactions with enantiomers, for example, hydrogen bonding, or acid-base interactions generally. Such weak interactions lead to reversible formation of entities which we refer to as complexes, and the equilibrium constant characterizing complex formation will differ for each member of the enantiomeric pair. The different equilibrium constants manifest themselves as a differing partition coefficient among the phases in a chromatographic process, leading ultimately to separation of enantiomers.

Thus, enantiomers of some chromium complexes were resolved by chromatography on powdered quartz, a naturally occurring chiral material. Karagounis and Coumolos, *Nature*, 142, 162 (1938). Lactose, another naturally occurring chiral material, was used to separate p-phenylene-bis-iminocamphor. Henderson and Rule, *Nature*, 141, 917 (1938). However, despite this knowledge substantiating theoretical considerations, advances in the art have been tortuous at best.

A major obstacle has been development of a chiral solid phase capable of resolving, at least in principle, a broad class of racemic organic compounds, with a stability which permits repeated usage, and with adequate capacity to make separation feasible on a preparative scale. Gil-Av has made a major contribution toward one kind of solution by gas-liquid phase chromatographic resolution of enantiomers using columns coated with N-trifluoroacetyl derivatives of amino acids, di- and tri-peptides. Gil-Av and Nurok, "Advances in Chromatography", Volume 10, Marcel Dekker (New York), 1974. However, the advances suffer practical limitations originating from the need to have volatile substrates and the inability to scale up methods employed.

Another advance is represented by the work of Baczuk and coworkers, *J. Chromatogr.*, 60, 351 (1971), who covalently bonded an optically active amino acid through a cyanuric acid linkage to a modified dextran support and utilized the resulting material in column chromatography to resolve 3,4-dihydroxyphenylalanine. A different approach is exemplified by polymerization of optically active amides with the resulting polymer used as a solid phase in liquid-solid chromatography. Blaschke and Schwanghart, *Chemische Berichte*, 109, 1967 (1976).

General considerations of the characteristics of a solid phase chiral chromatographic medium, including such factors as structural integrity, flow characteristics, chemical inertness, reusability, capacity, and incorporation into well developed commercial processes, suggest that a desirable material will be comprised of (1) a solid, largely inorganic support, bearing a (2) pendant functional group sufficiently removed from the surface of the support so that it may (3) covalently bond with a suitable site of a chiral molecule while enabling the latter to at least simulate its homogeneous interactions with racemic compounds it encounters.

SUMMARY

An object of this invention is to provide chiral material which can be used as a solid stationary phase in chromatographic separation of racemic mixtures. One embodiment of this invention comprises a silylated inorganic oxide bearing a chiral organic acid covalently bonded to the silylated organic moiety. In a more specific embodiment the core support is selected from the group consisting of silica and alumina, and said chiral organic acid is a hydroxy acid. In still another embodiment the chiral organic material is an ester or ether derivative of an hydroxy acid. In still another embodiment, the silylated inorganic oxide is a propylsilyl derivative.

DESCRIPTION OF THE INVENTION

A consideration of the theoretical mode of separation of racemates by chiral solid phase chromatographic media and desirable functional attributes of such media has led to compositions described herein. Said compositions of this invention are comprised of three parts: 1. an inert core support, providing mechanical strength, good flow properties, and being capable of chemically binding with a spacer molecule, with or without prior modification of the surface of the core support; 2. a spacer molecule, which is a compound one end of which is chemically bonded to the core support, the other end of which initially bears a functional group maintained at some distance from the surface of the core support by mediating atoms or groups of atoms; and 3. chiral material covalently bonded to the remaining terminus of the spacer molecule via the aforementioned functional group and bonded in such manner so as to retain its chirality and to preserve substantially the physical and chemical properties exhibited in homogeneous media.

The core support of this invention include metal oxides, glass, and ceramic materials. Among the metal oxides are included such materials as silica, alumina, zirconia, thoria, and combinations thereof. Silica and alumina are preferred materials of this invention, and among the aluminas gamma-alumina is especially preferred. In some applications glass or ceramic materials may be desirable. The one characteristic common to all the core supports of this invention is their ability to be silylated with appropriate organosilanes.

The spacer molecules of this invention are organosilanes. Their function is to firmly bind the chiral molecules to the core support while holding the molecule sufficiently distant from the surface of the core support so as to permit approximating the physical and chemical properties the chiral molecule exhibits under homogeneous conditions. Such organosilanes are derived from materials, whose formula may be given as UVW-Si(CH$_2$)$_n$B, which are characterized as having the property to react with surface hydroxy groups of the core support to form oxygen-silicon bond(s), i.e. all have the ability to silylate the core supports.

The value of n may be from 2 to about 10, with n equal 3 being a preferred material, this chain of mediating carbon atoms performing the spacer function. B is a functional group, such as halogen or amino, which subsequently reacts with the chiral acid leading to a covalent bond. For example, when B is a halogen, it may react with the hydroxyl group of hydroxy acids forming an ether linkage. When B is an amino group, it may react with an activated carboxyl group, for example, an anhydride or acid halide, to form an amide linkage. Chlorine is the halogen of choice, although fluorine, bromine, and iodine may also be used, but not necessarily with equivalent results.

The groups U, V, and W, are selected from the group consisting of halogen, alkoxy groups containing from 1 to about 10 carbon atoms, and alkyl groups containing from 1 to about 10 carbon atoms. It is required that at least one of such groups is not alkyl, and it is preferable that none of these groups are alkyl. Where U, V, or W is a halogen or alkoxy group, it may react with the surface hydroxy groups of the core support resulting in the spacer molecule becoming firmly attached to the surface. To an extent cross-linking of the silyl groups also occurs by formation of an Si-O-Si linkage. Thus the number of linkages between the silicon atoms of the organosilane and the oxygen atoms of the core support is, at least approximately, equal to the number of halogen and alkoxy groups of the organosilane reduced somewhat by the number of cross-linked silyl groups. Where U, V, and W are each either halogen or alkoxy groups, there results a combination of a 3-point attachment to the surface of the core support and cross-linking among the silyl groups, both of which are highly desirable.

Examples of precursors of spacer molecules which may be utilized in this invention include 3-chloropropyl-trimethoxysilane, 3-chloropropyl-triethoxysilane, 3-chloropropyl-tripropoxysilane, 3-chloropropyl-tributoxysilane, 3-chloropropyl-tripentoxysilane, 3-chloropropyl-dimethoxyethoxysilane, 3-chloropropyl-diethoxymethoxysilane, 3-chloropropyl-methoxyethoxypropoxysilane, 3-bromopropyltrimethoxysilane, 3-iodopropyl-triethyoxysilane, 3-chloropropyltrichlorosilane, 3-chloropropyl-tribromosilane, 3-chloropropyl-chlorodimethylsilane, 3-chloropropyl-dichloromethoxysilane, 3-chloropropyldimethoxymethylsilane, 3-chloropropyl-dimethoxyethylsilane, 3-chloropropyl-dimethoxypropylsilane, 3-chloropropyl-methoxyethoxypropylsilane, 4-chlorobutyltrimethoxysilane, 5-chloropentyl-trimethoxysilane, 6-chlorohexyl-trimethoxysilane, 10-chlorodecyl-trimethoxysilane, 4-chlorobutyltrichlorosilane, 10-chlorodecyl-trichlorosilane, 3-aminopropyl-trimethoxysilane, 3-aminopropyl-triethoxysilane, 3-aminopropyl-tripropoxysilane, etc., 3-aminopropyl-dimethoxymethylsilane, 3-aminopropyl-diethoxymethylsilane, 3-aminopropyl-diethylethoxysilane, 4-aminobutyl-trimethoxysilane, 5-aminopentyl-trimethoxysilane, 10-aminodecyl-trimethoxysilane, etc. It is to be understood that the compounds cited are merely representative of the class which may be employed, and that the present invention is not necessarily limited thereto.

The chiral molecules of this invention are hydroxy acids and their derivatives. A partial, not exclusive list of such acids, cited solely for illustrative purposes, include tartaric acid, lactic acid, malic acid, mandelic acid, glyceric acid, 3-phenyl-2-hydroxypropionic acid and ring substituted derivatives thereof, ascorbic acid, and sugar acids such as gluconic and glucaric acids. The use of derivatives of hydroxy acids often confer benefits which are advantageous. Such derivatives may be either of the hydroxyl or the carboxyl group. Among such derivatives of the hydroxyl group, ethers and esters are especially important. The ethers may be alkyl, aryl, substituted aryl, or aralkyl ethers. Examples include methoxy, ethoxy, propoxy, butoxy, phenoxy, nitrophenoxy, di-nitrophenoxy, benzyloxy, hydroxybenzyl, nitrobenzyl, dinitrobenzyl, 9-anthryl, 9-anthrylmethyl, etc.

The esters of the hydroxyl group which may be used in this invention may be esters of either aliphatic or aromatic acids. Examples include esters of acetic, propionic, butyric, caproic, 2-chloroacetic, 2-bromoacetic, hydroxyacetic, aminoacetic, benzoic, hydroxybenzoic, nitrobenzoic, dinitrobenzoic, halobenzoic acids, etc.

The derivatives of the carboxyl group suitable for use of this invention include esters of alcohols and phenols. Among such esters are included methyl, ethyl, propyl, butyl, benzyl, hydroxybenzyl, nitrobenzyl, dinitrobenzyl, phenol, hydroxyphenyl, halophenyl, dihalophenyl, nitrophenyl, dinitrophenyl esters, etc.

The other broad class of carboxyl derivatives which find use in this invention are amides and related derivatives, such as ureas and urethanes.

Specific examples of derivatives which may be used in this invention, which are cited solely for purposes of illustration and should not be construed as a limitation in any manner, include monoacetyl tartaric acid, dibenzoyl tartaric acid, 2-benzyloxysuccinic acid (the benzyl ether of malic acid), 2-nitrophenoxysuccinic acid, 2-chlorobenzoyloxypropionic acid (the chlorobenzoate ester of the hydroxy group of lactic acid), ethyl glycertate, dinitrobenzyl lactate, butyl mandelate, the diamide of malic acid, glyceric acid N-anthrylamide, etc.

Where B of the organosilane is a halogen, bonding of the chiral molecule to the organosilane occurs via the hydroxyl group through a formed ether linkage. Where B is an amino group, bonding of the chiral molecule to the organosilane occurs via the carboxyl group through a formed amide linkage. The nature of the hydroxy acid, the racemic material, and the chromatographic separation may dictate which linkage will be preferred for a particular resolution.

From the foregoing description of this invention it is to be understood that the compositions described herein may be represented, at least in part, by the structure $XYZSi(CH_2)_n$-T-A. At least one member of the group X, Y, Z is an oxygen atom associated with the surface of the core support, not otherwise shown here, with the remaining members being halogen, or alkyl or alkoxy containing from 1 to about 10 carbon atoms. In a preferred mode each member of the group X, Y, Z is an oxygen atom of said surface of said support. The chain of mediating atoms, $(CH_2)_n$, performs the spacer function, with n an integer from 2 to about 10, and n equaling 3 being a preferred mode. The structure $XYZSi(CH_2)_n$-may be termed the spacer molecule. The terminus of the chain of mediating atoms is covalently bonded to an atom, T, which may be either (1) an oxygen atom of a hydroxyl group of the chiral organic acid, or (2) a nitrogen atom of an amide linkage derived from a carboxyl group of the chiral organic acid. In each case the remaining portion of said chiral organic acid is here designated as A.

The preparation of the materials of this invention is accomplished by first silylating the core support, and subsequently reacting the silyl derivative with the desired organic acid or a derivative thereof. For example, a solution of an organosilane of the type described above, such as 3-aminopropyl-trimethoxysilane, may be contacted with the core support, such as alumina, at a temperature from about 50° to about 100° C. for a time from about 1 to about 5 hours. The solution contains from about 0.01 to about 0.5 moles organosilane per 50 grams of inorganic oxide. The silylated support may then be separated from the liquid, by filtration for example, and subsequently washed with an organic solvent, preferably a water miscible solvent, followed by a water wash, after which the support may be dried for storage.

A mixture of the anhydride of the chiral acid and a suitable base, such as a trialkylamine, in a solvent such as tetrahydrofuran is then contacted with the silylated support at a temperature and for a time sufficient to achieve acylation of the amino group by the anhydride. A temperature from about 40° to about 100° C. for a time from about 1 to about 10 hours generally suffices. Typically, about 10% excess anhydride is used based on the amino groups present. The solid is then separated, as by filtration, and washed to remove adhering but not covalently bound organic material.

The examples given hereinafter are for illustrative purposes only and are not to be construed as a limitation of this invention.

EXAMPLE I

About 500 ml. of a 5% volume-volume solution of 3-aminopropyl-triethoxysilane in toluene was contacted with 50 g. of gamma-alumina. The mixture was placed in a 90° C. water bath and slowly stirred by rotation for about 2 hours. At the end of this time, the cooled silylated support was collected on a Buchner funnel, washed with acetone to remove adhering organic material, then washed with water and subsequently air dried.

To 57.7 g. of the silylated alumina (0.67 meq amine/g.) was added 13.2 g. d-(+)-dibenzoyl tartaric anhydride in 300 ml. tetrahydrofuran containing 7 ml. triethylamine. The mixture was heated to 50° C. for about 3 hours with mixing. The solid was isolated by filtration, washed with acetone to remove adhering but unbound organic material, then air dried.

EXAMPLE II

To 200 ml. of a 5% volume-volume solution of 3-aminopropyltriethoxysilane in toluene was added 50 g. silica gel. The mixture was heated at 90° C. for about 2 hours with continuous agitation (rotation). Cooled solid was collected by vacuum filtration, washed with several portions of acetone, then air dried.

The silylated silica gel was acylated with d-(+)-diacetyltartaric anhydride in a manner analogous to that described in Example I, with the reaction period being about 5 hours.

EXAMPLE III

A chiral support in which chiral organic hydroxy acid is bonded to the spacer molecule through a formed ether linkage is exemplified by the following description.

A 10% volume-volume solution of 3-chloropropyl-triethoxysilane may be contacted with 50 g. of silica gel or alumina, using 100 ml. solution for the former and 250 ml. for the latter. After mixing at about 50° C. for 2-8 hours, solid may be collected by filtration and washed with acetone, and then air dried. A mixture of the silylated oxide, d-ethyl mandelate as a 15% solution in toluene (15 mole percent excess) and an equimolar amount of pyridine may be heated at reflux for about 5 hours. Cooled solid may be separated by filtration and washed thoroughly with acetone, then air dried, to provide chiral ethyl mandelate bound to silylated support via a formed ether linkage.

We claim:

1. A composition for resolution of racemic mixtures comprising:

a. a core support selected from the group consisting of silica and alumina;

b. a spacer molecule, one terminus of which is bonded to the core support via a silicon atom; and c. a chiral organic acid or derivative thereof covalently bonded to the remaining terminus of said spacer molecule in such manner as to retain its chirality.

2. The composition of claim 1 wherein the alumina is gamma alumina.

3. The composition of Claim 1 wherein the spacer molecule is an organosilane of the formula XYZSi(CH$_2$)$_n$-, where at least one member of the group X, Y, Z, is an oxygen atom associated with a surface of the inorganic oxide, and the remaining members are selected from the group consisting of halogen, alkyl and alkoxy containing from 1 to about 10 carbon atoms, n is an integer from 2 to about 10, where the remaining terminus of said spacer molecule is covalently bonded to an oxygen atom of a hydroxyl group of said chiral organic acid or to a nitrogen atom of a carboxamide group derived from said chiral organic acid.

4. The composition of claim 3 wherein each member of the group X, Y, Z, is an oxygen atom associated with a surface of the inorganic oxide.

5. The composition of claim 3 wherein n is equal to 3.

6. The composition of claim 1 wherein the chiral organic acid is a hydroxy acid or a derivative thereof bonded to the organosilane via an ether linkage of an hydroxyl group.

7. The composition of claim 1 wherein the chiral organic acid is a hydroxy acid or a derivative thereof bonded to the organosilane via an amide linkage.

8. The composition of claim 6 or 7 wherein the chiral organic acid or a derivative thereof is selected from the group consisting of tartaric acid, lactic acid, malic acid, glyceric acid, mandelic acid, ascorbic acid, the sugar acids, 3-phenyl-2-hydroxypropionic acid and nuclear derivatives thereof.

9. The composition of claim 8 wherein the derivatives of said chiral organic acid are selected from the group consisting of ethers, esters, and amides.

* * * * *